United States Patent

Hegoas et al.

[11] Patent Number: 5,867,829
[45] Date of Patent: Feb. 9, 1999

[54] SUBSTANCE DISPENSING GLOVE

[76] Inventors: Gary Hegoas; Gene Hegoas, both of 35564 Thomas Rd., Agua Dulce, Calif. 91350

[21] Appl. No.: 953,393

[22] Filed: Oct. 16, 1997

Related U.S. Application Data

[60] Provisional application No. 60/028,140, Oct. 16, 1996.
[51] Int. Cl.$^6$ .................................................. N41D 19/00
[52] U.S. Cl. ...................................... 2/159; 2/158; 15/227; 119/605
[58] Field of Search ............................ 2/158, 159, 161.6, 2/161.7; 119/600, 605; 15/227; 401/7, 8, 200, 201

[56] References Cited

U.S. PATENT DOCUMENTS

| | | | |
|---|---|---|---|
| 1,896,941 | 2/1933 | Cohen | 2/158 |
| 2,210,754 | 8/1940 | Frank | 2/158 |
| 2,265,329 | 12/1941 | Wachs | 2/158 |
| 5,441,355 | 8/1995 | Moore | 401/7 |
| 5,473,789 | 12/1995 | Osler | 15/227 |

*Primary Examiner*—Gloria M. Hale
*Attorney, Agent, or Firm*—Roger A. Marrs

[57] ABSTRACT

A powder dispensing device to be worn on the hand of the user and wherein the palm of a glove, including the fingers, support a pouch for holding a quantity of powder. The pouch is provided with apertures on one side through which the powder is dispensed and the opposite side of the pouch is carried on the palm and fingers of the glove. The pouch includes an open end adjacent to the upper palm or wrist of the user through which the powder may be introduced to a storage compartment within the pouch. A device is provided for releasably closing the opening to hold the powder within the storage compartment.

11 Claims, 1 Drawing Sheet

SUBSTANCE DISPENSING GLOVE

This is a provisional application Ser. No. 68/028,140 filed Oct. 16, 1996.

BACKGROUND OF THE INVENTION

1. Field of the Invention

The present invention relates to the field of substance applicators, and more particularly to a novel pouch applicator for transferring a therapeutic substance to the coat and skin of an animal which is soothing to the animal during application and wherein the applicator is worn on the hand of the user so that the substance can be dispensed as the animal is stroked. As used herein, the powder is an example of a substance which assumes other forms such as a gel, liquid or the like.

2. Brief Description of the Prior Art

In the past, it has been the conventional practice to apply a therapeutic substance, such as flea powder or the like, to the coat and skin of an animal by shaking the powder from a dispensing container via small holes in the top of a can or bottle. While this is being done, the powder not only is dispensed onto the animal but also circulates through the air and, in some instances, is breathable by the person applying the powder. Also, the powder is susceptible to reside on the skin of the person, which may cause irritation and may be a source of allergy problems. In other instances, attempts have been made to use applicators which are rubbed or blotted against the coat and skin of the animal while simultaneously releasing a quantity of powder. Problems and difficulties have been encountered which stem largely from the fact that the animal must be held in place during release of the powder since the applicator does not lend itself to a normal or applicating action which is familiar and pleasurable to the animal.

Therefore, a long-standing need has existed to provide a novel substance dispenser for discharging or transferring the substance from a gloved container or supply to the coat and skin of an animal whereby the control of the animal is enhanced during the application of the substance. Also, it is important that during the application, the animal is not subjected to unnecessary holding or forced to assume unnatural positions. attempts have been made to use applicators which are rubbed or blotted against the coat and skin of the animal while simultaneously releasing a quantity of powder. Problems and difficulties have been encountered which stem largely from the fact that the animal must be held in place during release of the powder since the applicator does not lend itself to a normal or applicating action which is familiar and pleasurable to the animal.

Therefore, a long-standing need has existed to provide a novel powder dispensor for discharging or transferring the powder from a container to the coat and skin of an animal whereby the control of the animal is enhanced during the application of the powder. Also, it is important that during the application, the animal is not subjected to unnecessary holding or forced to assume unnatural positions.

SUMMARY OF THE INVENTION

Accordingly, the above problems and difficulties are avoided by the present invention which provides a novel powder dispensing device taking the form of a glove to be worn on the hand of the user and wherein the palm of the glove, including the fingers, support a pouch for holding a quantity of powder. The pouch is provided with a multiplicity of apertures or openings through which the powder is dispensed. The apertures are provided on one side of the pouch while the opposite side of the pouch is releasably attachable to the palm and fingers of the glove. The pouch includes an open end which is adjacent to the upper palm of wrist of the user through which the powder may be introduced to the storage compartment or area within the pouch. Means are provided for releasably closing the opening to hold the powder within the storage compartment. Both the glove and the pouch are flexible and the configuration of the pouch is similar to the configuration of the glove so that the pouch formfits into the palm and against the fingers of the glove.

Therefore, it is among the primary objects of the present invention to provide a novel powder applicator or dispensing device for a powdered substance which may be worn on the hand of the user and which may be applied by petting or caressing the fur of the animal.

Another object of the present invention is to provide a novel applicator for powder which is worn on the hand and which includes a pouch having a multiplicity of openings through which the powder may transfer to the coat of an animal as the animal is stroked or caressed in a normal and pleasurable fashion.

Yet another object of the present invention is to provide a novel applicator for applying powder to the coat of an animal which is worn on the hand of the user and is dispensed during a petting or stroking motion so that the animal is maintained calm and so that the powder is directed onto the coat of the animal rather than through the air and atmosphere which may be damaging to the person applying the powder.

Yet another object of the present invention is to provide a mitten or glove worn on the hand of the user for applying powder, such as flea powder, onto an animal without loss of the powder and during a pet massaging operation or procedure.

A further object resides in providing a powder dispensing glove which may be worn by the person applying powder to the coat of an animal through massaging and stroking motions and which is readily washable so that it may be reused from time to time.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
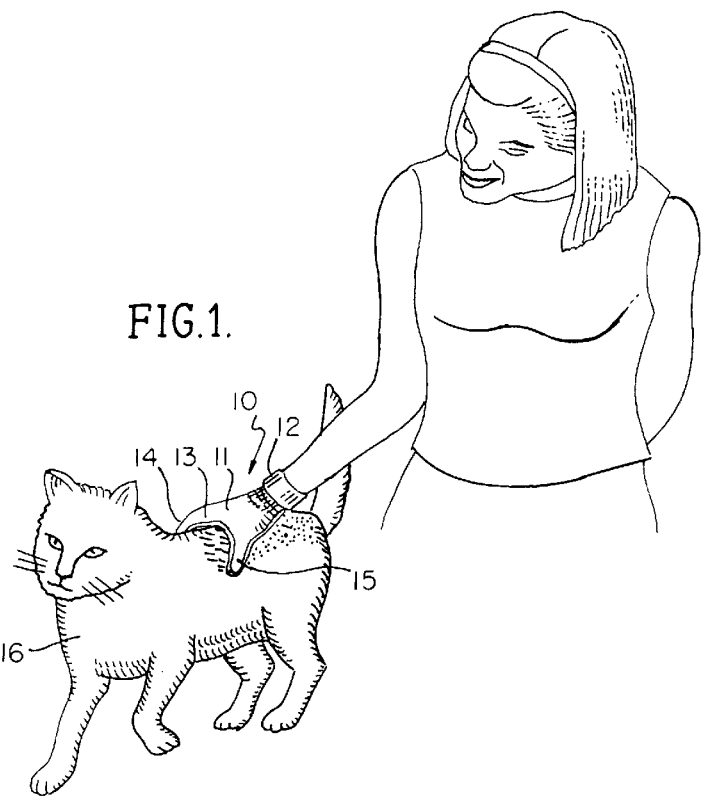
FIG. 1 is a front elevational view of the novel applicator of the present invention used for dispensing powder onto the coat of an animal.

Referring to FIG. 1, the novel powder dispenser or applicator of the present invention is illustrated in the general direction of arrow 10 which includes a glove 11 having a wrist section 12 and a body portion or section 13 that supports a plurality of sleeves, such as sleeves 14 and 15, for insertably receiving the index finger and thumb respectively. Other sleeves are provided for insertably receiving additional fingers or, if desired, the glove 11 body may be a mitten configuration or type.

It can be seen that the applicator 10 is worn on the hand of the user and that the user is stroking or massaging the animal 16 in a normal manner which places the animal at ease. As the powdered substance within the glove is dispensed onto the coat or skin of the animal 16, the substance is contained immediately adjacent to the animal and does not deposit on the skin of the user nor is the powder discharged into the air where the user may breathe or inhale the substance.

Figure 2:
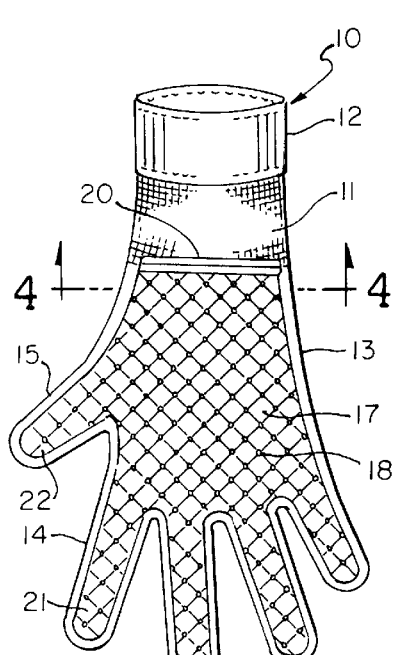
FIG. 2 is an enlarged front elevational view of the dispensing device shown in FIG. 1.

Referring now in detail to FIG. 2, it can be seen that the inside of the glove body 11 provides a pouch, indicated by numeral 17. The pouch is detachably carried on the palm and finger sleeve portions of the glove body 11 and the exposed side of the pouch 17 includes a multiplicity of holes, openings or apertures, such as the aperture indicated by numeral 18. The powder intended to be deposited on the coat of the animal is carried within the pouch 17 and is applied to the animal's coat through the multiplicity of openings 18 when the user applies normal petting or caressing pressure to the animal during the procedure.

The pouch 17 is provided with a closure 20 that may be of a zip-lock construction or any other suitable closure, such as a hook and pile releasable connection. When closed, the internal cavity of the pouch is full of powder and is only released through the multiplicity of apertures 18. Also, it is to be noted that the pouch includes a plurality of sleeves which correspond in shape and configuration to the sleeves intended to insertably receive the fingers of the user on the glove. In other words, the pouch 17 is glove-shaped so that the respective sleeves, such as sleeve 21 representing the index finger, is conforming to and corresponds to the sleeve 14 of the glove body 13. Sleeve 22 of pouch 17 corresponds with the thumb sleeve 15 of the glove body 13. The remaining sleeves can either be adapted for receiving the respective fingers of the user's hand, as illustrated, or, if desired, a single sleeve can be provided so that the glove takes the form of a mitten and the single sleeve would hold the three alternate fingers.

Preferably, the wrist portion or section 12 of the glove is of an elastic or constrictive knit material so that the powder will not enter the inside of the glove. Also, the glove 11 is composed of a close knit fabric having a mesh which will not permit passage of the powder to the user's hand. However, the material of pouch 17 may be of any suitable material, either plastic, fabric or an impregnated fabric or the like. Preferably, the pouch material should only permit discharging of the powder through the apertures 18.

Figure 3:
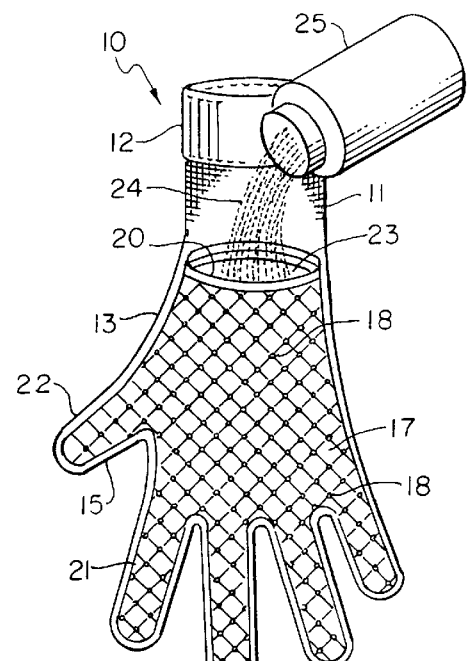
FIG. 3 is a view similar to the view of FIG. 2 illustrating the transfer of powder from a container into the applicator.

Referring now in detail to FIG. 3, it can be seen that the releasable fastener 20 may be opened to exposre the interior cavity 23 so that a quantity of powder 24 may be poured or otherwise introduced into the cavity from a storage container 25. Once such as sleeve 21 representing the index finger, is conforming to and corresponds to the sleeve 14 of the glove body 13. Sleeve 22 of pouch 17 corresponds with the thumb sleeve 15 of the glove body 13. The remaining sleeves can either be adapted for receiving the respective fingers of the user's hand, as illustrated, or, if desired, a single sleeve can be provided so that the glove takes the form of a mitten and the single sleeve would hold the three alternate fingers.

Preferably, the wrist portion or section 12 of the glove is of an elastic or constrictive knit material so that the powder will not enter the inside of the glove. Also, the glove 11 is composed of a close knit fabric having a mesh which will not permit passage of the powder to the user's hand. However, the material of pouch 17 may be of any suitable material, either plastic, fabric or an impregnated fabric or the like. Preferably, the pouch material should only permit discharging of the powder through the apertures 18.

Referring now in detail to FIG. 3, it can be seen that the releasable fastener 20 may be opened to exposure to the interior cavity 23 so that a quantity of powder 24 may be poured or otherwise introduced into the cavity from a storage container 25. Once the cavity 23 has been filled with a sufficient amount of powder, the closure 20 may close the entrance or opening leading into the storage compartment or cavity and the powder will be retained therein. It is to be understood that the powder is contained not only in the central palm portion of the pouch but into the sleeves as well and sleeve 21 is illustrative of the other sleeves.

Figure 4:
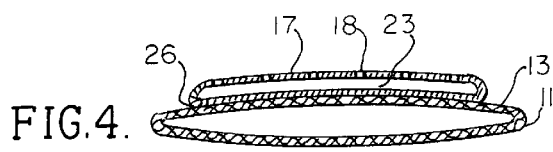
FIG. 4 is a transverse cross-sectional view of the dispensing device or applicator as shown in the direction of arrows 4—4 of FIG. 2.

Referring now in detail to FIG. 4, it can be seen that the pouch 17 is attached to the body 13 of the glove 11 by suitable means, such as adhesive or the like. Such an attachment is illustrated by numeral 24 and the attachment may be of a hook and pile fastener, a suitable adhesive, snaps or the like. Also, it is to be understood that aperture 18 represents only one of a plurality of apertures which connect the storage cavity 23 externally of the pouch 17 so that powder contained in the cavity may be distributed along the face of the pouch 17. The glove 11 is of conventional manufacture and it is the combination of the pouch and glove from which the inventive concept is derived.

In view of the foregoing, it can be seen that the powder, such as flea powder contained within the pouch 17, may be distributed to the coat of the animal 16 through the multiplicity of holes, apertures or the like, as identified by numeral 18. The powder is forced through the opening when the glove is placed on the hand of the user and the user applies a stroking or petting pressure to the coat of the animal. When it is desired to refill the pouch, the connector 20 is opened to expose the inner storage cavity or compartment 23 so that the powder 25 may be poured therein. The glove 11 is form-fitting to the user's hand while the pouch 17 is conformal in configuration to the glove whether it is of a finger glove type or whether it is of a mitten non-fingered type.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A substance dispensing hand-worn mitten or glove comprising:

a hand covering adapted to accommodate the hand of a user and having a front covering and a back covering separated by a compartment to be occupied by the hand of the user;

a pouch carried on said front covering of said hand covering;

said pouch detachably connected to said front covering and including a plurality of dispensing openings; and a quantity of a therapeutic substance releasably carried in said pouch via said openings.

2. The invention as defined in claim 1 wherein:

said pouch constitutes an enclosed container having a selected side releasably attached to said hand covering and further including an access opening leading into an interior of said pouch.

3. The invention as defined in claim 2 including:

a closure means operably carried on said pouch adjacent said opening for selectively opening and closing said opening.

4. The invention as defined in claim 3 wherein:

said pouch dispensing openings provided on a side opposite to said selected side releasably attached to said hand covering front covering for discharging said therapeutic substance exteriorly of said pouch.

5. The invention as defined in claim 4 wherein:

said hand covering includes finger receiving sleeves and said pouch includes sleeves matable with said finger receiving sleeves.

6. The invention as defined in claim 5 wherein:

said hand covering releasably attaches with said pouch critically at the palm thereof.

7. The invention as defined in claim 6 wherein:

said dispensing openings in said pouch are provided by a close mesh fabric.

8. The invention as defined in claim 7 wherein:

said therapeutic substance is selected from the group of:
 a. powder
 b. gel
 c. liquid.

9. The invention as defined in claim 8 including:

releasable means cooperatively carried on said hand covering and said pouch for detachably securing said pouch to said hand covering.

10. The invention as defined in claim 9 wherein:

said hand covering includes a constrictive wrist material adapted to seal with the wrist of the user.

11. The invention as defined in claim 10 wherein:

said hand covering is composed of a liquid and powder impervious material in contrast to the material of said pouch.

\* \* \* \* \*